US010275848B2

(12) United States Patent
Harris

(10) Patent No.: US 10,275,848 B2
(45) Date of Patent: Apr. 30, 2019

(54) GRAPHICS PROCESSING

(71) Applicant: ARM Limited, Cambridge (GB)

(72) Inventor: Peter William Harris, Cambridge (GB)

(73) Assignee: Arm Limited, Cambridge (GB)

( * ) Notice: Subject to any disclaimer, the term of this patent is extended or adjusted under 35 U.S.C. 154(b) by 18 days.

(21) Appl. No.: 15/214,170

(22) Filed: Jul. 19, 2016

(65) Prior Publication Data
US 2017/0024848 A1 Jan. 26, 2017

(30) Foreign Application Priority Data
Jul. 20, 2015 (GB) .................................. 1512669.1

(51) Int. Cl.
G06T 15/50 (2011.01)
G06T 1/20 (2006.01)
G06F 9/38 (2018.01)

(52) U.S. Cl.
CPC . G06T 1/20 (2013.01); G06F 9/38 (2013.01)

(58) Field of Classification Search
CPC ... G06F 9/3808; G06F 9/3855; G06T 15/005; G06T 1/20; G06T 15/00; G06T 15/50; G06T 15/80
See application file for complete search history.

(56) References Cited

U.S. PATENT DOCUMENTS

2005/0071438 A1  3/2005 Liao
2008/0198166 A1* 8/2008 Chung ................. G06T 15/005
                                                    345/501
2010/0122067 A1* 5/2010 Lindholm ............. G06F 9/3802
                                                    712/205
2012/0096474 A1  4/2012 Jiao
2013/0298133 A1 11/2013 Jones
2013/0305258 A1 11/2013 Durant
2015/0378733 A1* 12/2015 Beylin ................. G06F 9/3887
                                                    712/226

FOREIGN PATENT DOCUMENTS

GB        2516358        1/2015

OTHER PUBLICATIONS

Combined Search and Examination Report dated Jan. 25, 2016; GB Patent Application No. GB1512669.1.

* cited by examiner

Primary Examiner — Hau H Nguyen
(74) Attorney, Agent, or Firm — Vierra Magen Marcus LLP

(57) ABSTRACT

The sequence of instructions for a shader program 60 to be executed by a shader core of a graphics processor is divided into an initial set of instructions 61 that perform "global" common expressions of the shader program, a set of instructions 62 in the shader program that perform expressions that are common to a given work group within a set of work items that the shader program is to process, and a main instruction sequence 63 that needs to be executed independently for each work item.

Execution threads are then able to start executing the shader program either at the beginning of the global common expressions 64, or at the beginning of the work group common expressions 65, or at the beginning of the main instruction sequence 66.

24 Claims, 11 Drawing Sheets

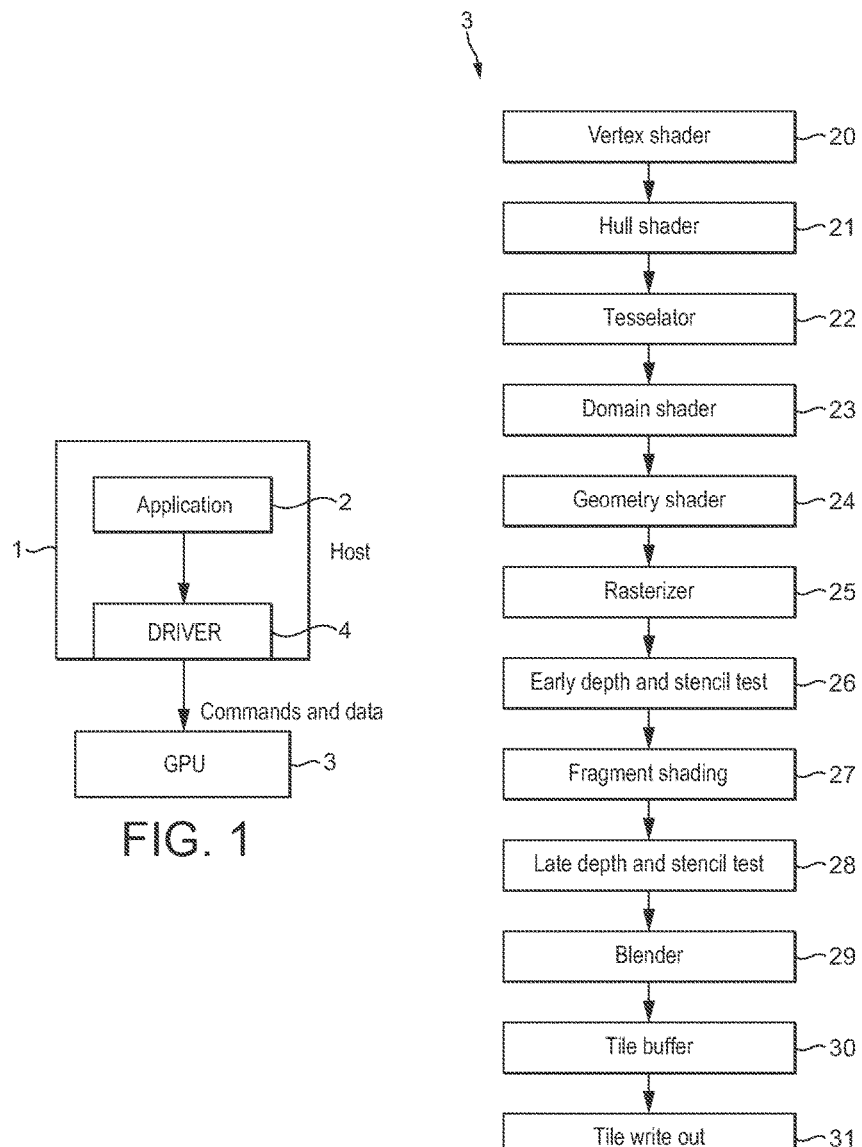

| Full Shader | CT-CSE Workload | Per-Fragment Workload |
|---|---|---|
| #version 300 es | uniform vec4 A; | uniform temp |
| uniform vec4 A; | uniform vec4 B; | in vec4 inV |
| uniform vec4 B; | uniform vec4 C; | out vec4 outF |
| uniform vec4 C; | out uniform temp; | void main () { |
| in vec4 inV | temp = A * B * C; | outF = inV * temp; |
| out vec4 outF | | } |
| void main () { | | |
| outF = inV * A * B * C; | | |
| } | | |
| 50 | 51 | 52 |

FIG. 4

GRAPHICS PROCESSING

BACKGROUND

The technology described herein relates to graphics processors, and in particular to the operation of graphics processors that include one or more programmable processing stages ("shaders").

Graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of, a geometry shader, a vertex shader and a fragment (pixel) shader. These shaders are programmable processing stages that execute shader programs on input data values to generate a desired set of output data (e.g. appropriately shaded and rendered fragment data in the case of a fragment shader) for processing by the rest of the graphics pipeline and/or for output. The shaders of the graphics processing pipeline may share programmable processing circuitry, or they may each be distinct programmable processing units.

A shader program to be executed by a given "shader" of a graphics processing pipeline will be provided by the application that requires the processing by the graphics processing pipeline using a high-level shader programming language, such as GLSL, HLSL, OpenCL, etc. This shader program will consist of "expressions" indicating desired programming steps defined in the relevant language standards (specifications). The high-level shader program is then translated by a shader language compiler to binary code for the target graphics processing pipeline. This binary code will consist of "instructions" which are specified in the instruction set specification for the given target graphics processing pipeline. The compilation process for converting the shader language expressions to binary code instructions may take place via a number of intermediate representations of the program within the compiler. Thus the program written in the high-level shader language may be translated into a compiler specific intermediate representation (and there may be several successive intermediate representations within the compiler), with the final intermediate representation being translated into the binary code instructions for the target graphics processing pipeline.

Thus, references to "expressions" herein, unless the context otherwise requires, refer to shader language constructions that are to be compiled to a target graphics processor binary code (i.e. are to be expressed in hardware microinstructions). (Such shader language constructions may, depending on the shader language in question, be referred to as "expressions", "statements", etc. For convenience, the term "expressions" will be used herein, but this is intended to encompass all equivalent shader language constructions such as "statements" in GLSL.) "Instructions" correspondingly refer to the actual hardware instructions (code) that are emitted to perform an "expression".

A graphics processing pipeline shader thus performs processing by running small programs for each "work item" in an output to be generated, such as a render target, e.g. frame (a "work item" in this case would be usually a vertex or a sampling position (e.g. in the case of a fragment shader)). Where the graphics processing pipeline is being used for "compute shading" (e.g. under OpenCL or DirectCompute) then the work items will be appropriate compute shading work items. This shader operation generally enables a high degree of parallelism, in that a typical render output, e.g. frame, features a rather large number of work items (e.g. vertices or fragments), each of which can be processed independently.

In graphics shader operation, each work item is processed by means of an execution thread which will execute the shader program in question for the work item in question. As there will typically be a large number of work items (e.g. vertices or sampling positions), and thus corresponding threads, to be processed for a given shader program, a graphics processing system can be considered to be a massively multi-threaded system.

The Applicants have recognised that many graphics shader programs will include operations (expressions) that will produce identical values for sets of plural threads to be executed (e.g. for every thread in a draw call).

For example, the OpenGL ES vertex shader:

```
uniform mat4 a;
uniform mat4 b;
uniform mat4 c;
attribute vec4 d;
void main( )
{
    gl_Position = a * b * c * d;
}
``` will produce identical values for the computation of "a*b*c" for each thread (where each thread represents a given vertex), as the data inputs are uniform variables. Thus if this computation could be executed once and the result shared between plural threads, the execution of the shader program could be made more efficient.

The Applicants have previously proposed in their earlier UK patent application no. GB-A-2516358 the use of a "pilot" shader program to execute once expressions that will produce identical values for a set of plural threads (e.g. for a draw call), and then a "main" shader program which executes for each work item, using the results of the "pilot" shader" instead of recalculating the common expressions each time.

However, notwithstanding this, the Applicants believe that there remains scope for improvements to execution of shader programs in graphics processing pipelines that include one or more shader stages.

BRIEF DESCRIPTION OF THE DRAWINGS

A number of embodiments of the technology described herein will now be described by way of example only and with reference to the accompanying drawings, in which:

FIG. 1 shows an exemplary computer graphics processing system;

FIG. 2 shows schematically a graphics processing pipeline that can be operated in the manner of the technology described herein;

FIG. 4 shows an example of a shader program;

Like reference numerals are used for like components where appropriate in the drawings.

DETAILED DESCRIPTION

Figure 3:
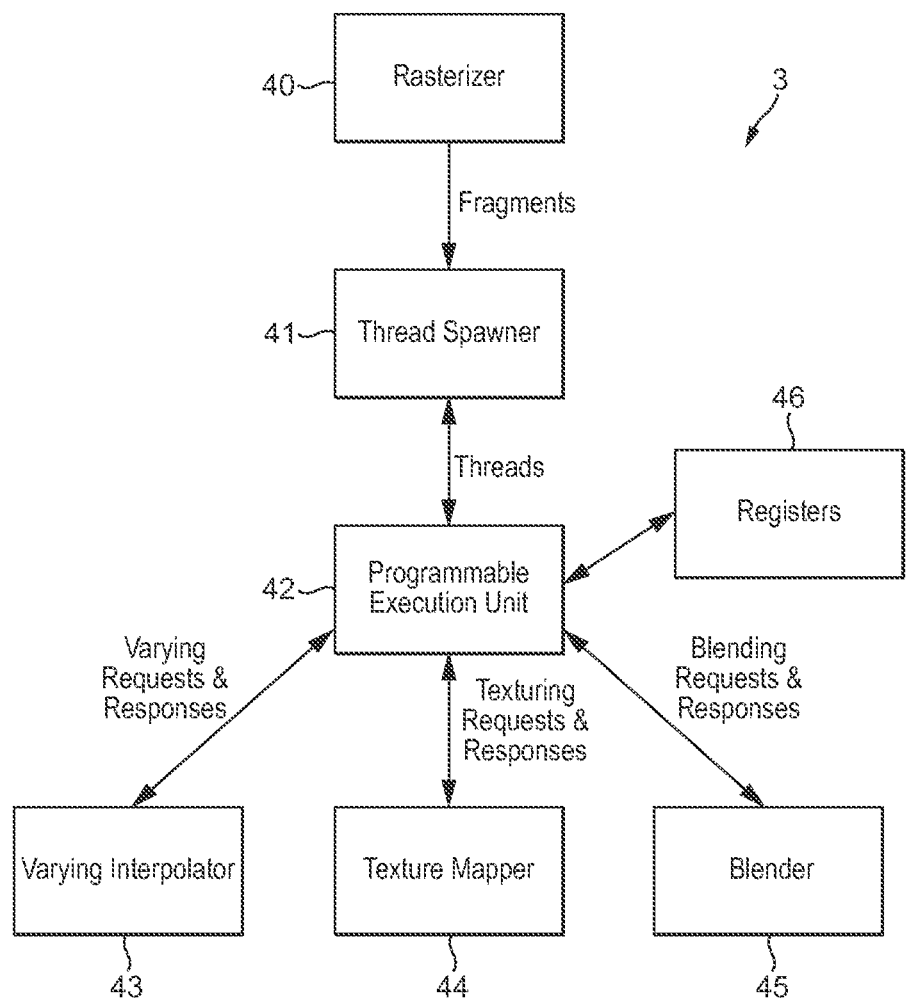
FIG. 3 shows schematically a graphics processing unit.

A first embodiment of the technology described herein comprises a method of operating a graphics processing pipeline which includes a programmable shading stage that executes instructions to perform shading operations, the method comprising:

when the shader stage is to execute a shader program to perform shading operations, the shader program comprising a sequence of instructions to be performed when executing the shader program:

issuing plural execution threads to the shader stage for which the shader program is to be executed for execution; wherein:

the issuing of the execution threads to the shader stage for execution of the shader program is configured such that the execution of the shader program can be started at different instructions within the sequence of instructions for the shader program for different ones of the execution threads; and executing the shader program for the execution threads; wherein:

executing the shader program for the execution threads comprises:

executing the shader program for one or more of the execution threads starting at a first point in the sequence of instructions for the shader program; and executing the shader program for another one or ones of the execution threads starting at a different point in the sequence of instructions for the shader program.

A second embodiment of the technology described herein comprises a graphics processing pipeline which includes a programmable shading stage that executes instructions to perform shading operations; wherein:

the graphics processing pipeline is configured to:

when the shader stage is to execute a shader program to perform shading operations, the shader program comprising a sequence of instructions to be performed when executing the shader program:

issue plural execution threads to the shader stage for which the shader program is to be executed for execution; wherein:

the issuing of the execution threads to the shader stage for execution of the shader program is configured such that the execution of the shader program can be started at different instructions within the sequence of instructions for the shader program for different ones of the execution threads; and execute the shader program for the execution threads; wherein:

executing the shader program for the execution threads comprises:

executing the shader program for one or more of the execution threads starting at a first point in the sequence of instructions for the shader program; and executing the shader program for another one or ones of the execution threads starting at a different point in the sequence of instructions for the shader program.

The technology described herein relates to the execution of shader programs in graphics processing pipelines. In the technology described herein, different execution threads for which a shader program is to be executed can start executing instructions in the shader program at different start points in the shader program. In other words, the shader program has plural possible "start" ("entry") points for execution threads, such that threads can start their execution of the shader program at different points within the shader program (e.g., and in an embodiment, at a point that is more appropriate for the execution thread in question).

The Applicants have recognised in this regard that it can be possible to arrange for "common" operations (expressions) in a shader program (i.e. expressions (operations) that will produce the same value(s) each time they are executed for some or all of the threads in a set of threads that are executing the shader program) to be executed at or near the beginning of the shader program, with the "non-common" operations (expressions) (i.e. that will (potentially) produce a different value(s) for each thread in a set of threads that are executing the shader program) then being performed later in the shader program.

Furthermore, by allowing execution threads to "enter" (start) a shader program at different points within the sequence of instructions for the shader program, some threads can execute the shader program from the beginning (and thereby, e.g., perform the common operations in the shader program), with other threads being arranged to start their execution of the shader program at a later point (thereby, e.g., and in an embodiment, avoiding executing the common operations for those threads). This can then have the effect and advantage of reducing the number of threads for which the "common" operations (expressions) are performed, thereby making overall execution of the shader program more efficient.

Thus, in the technology described herein, the number of threads that execute instructions that perform "common" expressions in a shader program can be reduced. However, the technology described herein does not require the generation and execution of a separate "pilot shader" program to do this, and therefore avoids issues that can arise with executing pilot shader programs, such as the fact that the pilot shader may execute only on a single thread (and therefore be relatively inefficient on typically massively multi-threaded graphics processing pipeline architectures).

The technology described herein can also, as will be discussed further below, be used to more efficiently perform common operations for shaders, such as compute shaders, where the processing load can be organised into distinct "work groups".

The programmable shading stage of the graphics processing pipeline can comprise any suitable and desired programmable shading stage ("shader") of the graphics processing pipeline (and that a graphics processing pipeline can include or act as). Thus the shading stage may be (may be operating as), e.g. a vertex shader, a fragment shader, or a compute shader. The programmable shading stage may operate solely as one type of shader, but it will be appreciated in this regard that the programmable shading stage may typically be able to (and in an embodiment can) run plural different types of shader, i.e. such that there may be one or more programmable stages of the graphics processing pipeline that may be appropriately programmed, e.g. at different times, to function as one type of shader (e.g. as a fragment shader (to perform fragment shading operations)), and to function as other forms (types) of shader.

Correspondingly the shader program that is issued to the (programmable) shader stage can be any suitable and desired shader program for execution by the programmable shading stage.

Execution of the shader program should (and in an embodiment does) produce some useful graphics processing output data, i.e. data for use in graphics processing operations, such as (an array of) vertex data, (an array of) fragment data, etc. Thus, in an embodiment, executing the shader program for the execution threads comprises executing the shader program so as to generate (an array of) graphics processing output data.

The generated output data may be further processed (in an embodiment for display), e.g. by the graphics processing pipeline, and/or provided to a display for display. Thus, in an embodiment, the generated output data is further processed, e.g. for display. In an embodiment, the generated output data is used to provide an image for display, e.g. is provided to a display for display.

The techniques of the technology described herein can be used in respect of some but not all of the shader programs to be executed, e.g. for a given processing operation (e.g. draw call), but in an embodiment are used in respect of all shader programs to be executed for a given processing operation (e.g. draw call).

The programmable shading stage will be, and is in an embodiment, implemented as appropriate programmable processing circuitry. There is in an embodiment a programmable execution unit that is operable to execute shading programs to perform processing operations. Thus the programmable execution unit will receive execution threads to be executed, and execute appropriate shading programs for those threads to generate the desired output.

There may be a single or plural programmable execution units. Where there are plural programmable execution units, each execution unit can in an embodiment operate in the manner of the technology described herein.

The execution threads that are issued to the shading stage to execute the shader program will represent appropriate "work items" for the shader program in question. Thus they may, for example, represent vertices for a vertex shading program, or sampling points (or pixels) for a fragment shading program, etc.

A plurality of execution threads will be issued to the shading stage for execution. The execution threads can be issued to the shading stage by any suitable and desired component or element of the graphics processing unit (graphics processor) that operates as the graphics processing pipeline. In an embodiment, the graphics processing pipeline includes execution thread issuing circuitry that operates to issue the execution threads. In an embodiment there is a thread spawner and/or scheduler (thread spawner circuitry and/or scheduler circuitry) that operates to issue the execution threads, e.g. and in an embodiment, to a programmable execution unit of the graphics processing unit that executes the shader program for the execution threads.

The plural execution threads that are issued to the shading stage for execution are in an embodiment executed (at least partially) in parallel, i.e. concurrently (at the same time).

The plural execution threads that are issued to the shader stage for execution can comprise any suitable and desired set of plural execution threads. Thus they may, for example, comprise all the threads that are to be executed to generate the desired output, e.g. frame, or part (e.g. tile) of a frame, in question, or they may be a subset of threads within that overall set of threads (e.g. the set of threads to be executed for a given draw call of an overall output that is being generated). The set of threads could also be the threads for a given work group or set of work groups for which the shader program is to be executed (e.g. when the graphics processing pipeline is performing compute shading operations). Other arrangements would, of course, be possible.

As discussed above, the execution threads for which the shader program is to be executed are able to start their execution of the shader program at different starting (entry) points in the shader program (in the sequence of instructions for the shader program).

The one or ones of the plural execution threads for which the shader program is executed starting at the first point in the sequence of instructions for the shader program is or are in an embodiment executed (at least partially) in parallel with, i.e. concurrently with (at the same time as) the another one or ones of the execution threads that are executed starting at a different (e.g. later) point in the sequence of instructions for the shader program. That is, the plural threads that start at different points in the shader program are in an embodiment executed in parallel, i.e. concurrently (at the same time).

Thus, executing the shader program for the execution threads in an embodiment comprises executing the shader program for one or more of the execution threads starting at a first point in the sequence of instructions for the shader program, and concurrently executing the shader program for another one or ones of the execution threads starting at a different point in the sequence of instructions for the shader program.

Executing plural threads simultaneously in this way means that the processing is relatively efficient, e.g. using a massively multi-threaded graphics processing pipeline architecture.

This will accordingly mean that at least one or some instructions in the sequence of instructions that appear relatively late in the sequence of instructions may be executed for a thread at the same time as or before another instruction or instructions that appears relatively early in the sequence of instructions is executed (for another thread).

As will be described in more detail below, where the result or results of the execution of an (e.g. earlier) instruction or instructions for a thread is or are required for execution of a (e.g. later) instruction or instructions for another thread, then it may be necessary for the execution of the shader program for one or more of the threads to wait (to be blocked) until the instruction or instructions in question are executed for another or others of the threads (and in an embodiment this is done).

Thus, in an embodiment, executing the shader program for the plural execution threads comprises blocking (stalling) the execution of the shader program for one or more of the threads.

In an embodiment, the execution of the shader program for one or more of the execution threads that start at a later point in the sequence of instructions for the shader program is blocked (stalled), in an embodiment until the execution of a particular, in an embodiment selected, instruction or instructions of the shader program for one or more of the execution threads that start at an earlier point in the sequence of instructions for the shader program has been completed. Thus, for example, in an embodiment, the execution of the shader program for the another one or ones of the execution threads (that start at the different (e.g. later) point in the sequence of instructions for the shader program) is blocked (stalled), in an embodiment until the execution of a particular, in an embodiment selected, instruction or instructions of the shader program for the one or more of the execution threads (that start at an earlier, e.g. the first, point) has been completed.

Once the instruction or instructions in question has or have been executed, then the execution of the shader program for the one or more threads which are blocked (stalled) is in an embodiment continued, in an embodiment using the results of the execution of the instruction or instructions in question.

As discussed above, the execution threads for which the shader program is to be executed are able to start their execution of the shader program at different starting (entry) points in the shader program (in the sequence of instructions for the shader program).

There should be at least two entry points for execution threads in the shader program. In one embodiment there are only two entry points for execution threads in the shader program. In other embodiments, there are more than two entry points for execution threads in the shader program. In an embodiment, there are three entry points for execution threads in the shader program. The entry points for execution threads that are provided in the shader program can be selected as desired. One of the entry points should be, and is in an embodiment, the start of the shader program (i.e. at the first instruction in the sequence of instructions for the shader program, and from which a thread may be correctly executed to completion, without, for example, relying on data output by any other thread). This entry point may thus include the common operations in the shader program.

The position of the other entry point or points in the shader program can be selected as desired. In an embodiment, there is a second entry point in the shader program that is after some, and in an embodiment after all, of the instructions in the shader program that calculate common expressions in the shader program (i.e. that will produce the same result for each thread (work item) in the set of plural threads (work items) in question). In an embodiment there is an entry point for execution threads in the shader program that is after all the (and in an embodiment immediately after all the) instructions that perform common expressions in the shader program.

The Applicants have recognised that as well as a shader program containing common expressions that relate to (that will produce the same result for) all the threads (work items) (that are common to all the threads) in a set of plural threads to be executed, there may also be common expressions that relate to (that will produce the same result for) only subsets of threads (work items) with an overall set of threads (work items) to be executed. This may be the case, for example, where execution threads for a shader program can be grouped into respective work groups, such as could be the case for compute shaders, such as OpenCL and DirectCompute. In this case, there may be a set of expressions that will produce the same result for each thread (work item) in a work group, but which could or will produce different results for different work groups.

Thus, in an embodiment, it is possible for execution threads to start execution of the shader program after instructions that execute expressions in the shader program that will be "common" for a subset or subsets of a set of execution threads (work items) that the shader program is being executed for, as well as after sets of instructions in the shader program that execute expressions that are common for all the threads (work items) in a set of threads (work items) that the shader program is being executed for.

Thus, in an embodiment, there is a start point for execution threads in the shader program that is after a first set of instructions that execute common expressions in the shader program and another start point in the shader program that is after a second set of instructions that execute common expressions in the shader program. In this case one of the start points is in an embodiment after a set of instructions that executes expressions in the shader program that will produce a common result for a subset of the execution threads, e.g. and in an embodiment for the execution threads of a given work group.

Correspondingly, in an embodiment, there are three start points in the shader program for execution threads, one at the beginning of the shader program, one after a first set of instructions that execute common expressions in the shader program, and a third start point after a second set of instructions that execute common expressions in the work group.

In this case, the first set of instructions that execute common expressions could be, and are in an embodiment, instructions that execute common expressions for the shader program as a whole, with the second set of instructions that execute common expressions then being instructions that execute common expressions for respective work groups.

This arrangement may be particularly suitable for shader operations and shader programs in which execution threads can be grouped into work groups, such as could be the case for compute shaders, such as OpenCL and DirectCompute.

The shader program thread execution "entry points" can be determined and provided in or in relation to the shader program in any suitable and desired manner and by any suitable and desired element of the overall data processing system.

In an embodiment, the shader program thread execution start points are determined and set by the compiler (the shader compiler) for the graphics processing pipeline. Thus the compiler in an embodiment determines appropriate start points in the shader program. Having the compiler identify the thread execution start points has the advantage that the compiler is able to assess the shader program to determine if it is possible to include later start points in a shader program to be executed.

In an embodiment, the compiler analyses the shader program code that is provided, e.g. by the application on the host processor that requires the processing by the graphics processing pipeline, and determines whether plural start points in the shader program execution are possible, and if so, where those start points should be.

In an embodiment, the compiler is also operable to (where this is possible) re-order expressions (operations) in the shader program so as to, e.g., provide an opportunity to include a later thread start point in the shader program execution, and/or so as to allow for the more efficient inclusion and use of a later thread start point in the execution of the shader program.

In this regard, the compiler in an embodiment operates to place (the instructions for) any shader program expressions (operations) that will produce a common (the same) result for all the threads (work items) of a set of threads (work items) that the shader program is to be executed for earlier in (and in an embodiment at the beginning of) the execution order of the shader program. In an embodiment, the compiler also identifies and operates to place (the instructions for) any shader program expressions (operations) that will produce common (the same) results for a subset of the threads (work items) of the set of threads (work items) that the shader program is to be executed for earlier in (towards the beginning of) the shader program execution, and in an embodiment after (and in an embodiment immediately after) any (instructions for) expressions (operations) that will produce common results for all the threads (work items) in the set of threads (work items).

Correspondingly, the compiler in an embodiment places any (instructions for) shader program expressions (operations) that are (definitely) required to be executed for each thread (work item) individually (i.e. that potentially will produce a different result for each individual thread (work item)) towards the end of the shader program execution (and at least after some, and in an embodiment after all, of the (instructions for) shader program expressions (operations) that will produce common results for plural threads (work items)).

In an embodiment, the compiler operates to place any shader program instructions that execute expressions which need to be executed for each work item individually, and which are dependent upon the results of earlier instructions that execute common expressions in the shader program, after the instructions that execute common expressions in the shader program (or at least after the instructions that execute common expressions in the shader program that those instructions are dependent upon). This could comprise, e.g., simply placing the instructions after all the instructions in the shader program that execute common expressions, or the arrangement could be such that the instructions are at least placed after the instructions that execute the common expressions that those instructions are dependent upon.

Correspondingly, in an embodiment, where the shader program includes instructions that execute expressions which need to be executed for each work item individually, but which are not dependent upon the results of earlier instructions that execute common expressions in the shader program, then those instructions which are not dependent upon the results of earlier instructions that execute common expressions in the shader program are in an embodiment arranged to occur in the sequence of instructions for the shader program after the instructions that execute the common expressions, but before any "per-work item" instructions that are dependent upon the common expressions.

Correspondingly, any (or the) start point in the shader program that is after the common expression instruction execution is in an embodiment set to be at the beginning of any, e.g., per-work item, instructions that do not depend upon the common expressions. This can then allow, for example, execution threads that are to start at that later point in the shader program execution sequence to start executing instructions before the instructions that perform the common expressions have been completed.

The compiler may, e.g., and in an embodiment does, run on a host processor of the overall data processing system that includes the graphics processing pipeline (with the graphics processing pipeline then being on another processor, such as a graphics processor, that is associated with the host processor (such that the compiler and compiled code run on separate processors within the overall data graphics processing system)). However, other arrangements would be possible, such as the compiler running on the same processor as the compiled code, or the compiler being run on a (completely) separate processor, such as the program being precompiled on a separate system and being distributed in a compiled form.

The operation in the manner of the technology described herein to identify and provide plural thread execution start points in a shader program to be executed can be (and in one embodiment is) considered for each and every shader program that is to be executed by the graphics processing pipeline. It would also be possible to try to identify and provide plural thread execution start points only for particular categories or types of shader programs but not for other categories or types of shader programs (e.g. where the type of shader program is unlikely to offer useful plural thread execution start points).

It is not necessary that each and every shader program has to have plural thread execution start points included in it, for example where the compiler determines that suitable plural thread execution start points do not exist or may not be so useful in the shader program in question.

The technology described herein also extends to the compiler itself.

Thus, another embodiment of the technology described herein comprises a compiler that compiles programs to generate instructions for a shading stage of a graphics processing pipeline that executes instructions to perform shading operations;

wherein the compiler is configured to, for a shader program to be executed by a shader stage:

place instructions for shader program expressions that will produce the same result for all the work items of a set of work items that the shader program is to be executed for in the execution order of the shader program before instructions for shader program expressions that are required to be executed for each work item individually.

Another embodiment of the technology described herein comprises a method of compiling a program to generate instructions for a shading stage of a graphics processing pipeline that executes instructions to perform shading operations;

the method comprising, for a shader program to be executed by a shader stage:

placing instructions for shader program expressions that will produce the same result for all the work items of a set of work items that the shader program is to be executed for in the execution order of the shader program before instructions for shader program expressions that are required to be executed for each work item individually.

As will be appreciated by those skilled in the art, these embodiments of the technology described herein can and in an embodiment do include any one or more or all of the optional features of the technology described herein, as appropriate.

Thus, for example the compiler in an embodiment also identifies and operates to place the instructions for any shader program expressions that will produce the same results for a subset of the work items of the set of work items that the shader program is to be executed before instructions for shader program expressions that are required to be executed for each work item individually, and in an embodiment after (and in an embodiment immediately after) any instructions for expressions that will produce common results for all the work items in the set of work items.

Correspondingly, the compiler in an embodiment operates to place any shader program instructions that execute expressions which need to be executed for each work item individually, and which are dependent upon the results of earlier instructions that execute common expressions in the shader program, after the instructions that execute common expressions in the shader program (or at least after the instructions that execute common expressions in the shader program that those instructions are dependent upon).

Similarly, in an embodiment, where the shader program includes instructions that execute expressions which need to be executed for each work item individually, but which are not dependent upon the results of earlier instructions that execute common expressions in the shader program, then those instructions which are not dependent upon the results of earlier instructions that execute common expressions in the shader program are in an embodiment arranged to occur in the sequence of instructions for the shader program after the instructions that execute the common expressions, but before any "per-work item" instructions that are dependent upon the common expressions.

An execution thread can be configured to be able to start execution of the shader program at a later stage in the shader program in any suitable and desired manner. For example, threads could be allocated different initial program counter-values to set their different "entry points" to the shader program (and in one embodiment this is done). In this case, the different start points within the shader program could be indicated by means of different absolute program counter-values, or there could be one program counter-value that, e.g., indicates a first start point in the shader program, with an offset or offsets to that program counter-value then being used to indicate and trigger other start points within the shader program.

Additionally or alternatively, instructions in the shader program, such as instructions that correspond to common expressions, that are only to be executed if the thread starts at a particular start point in the shader program (e.g. at the beginning of the shader program) could be denoted (e.g. flagged) as such, with the execution threads correspondingly being configured so as to either execute those instructions or not, as appropriate.

For example instructions that correspond to common expressions could be denoted as such, with execution threads then checking a flag or other indication that indicates whether those instructions have already been completed or not when they encounter a marked "common expression" instruction, and either executing the "common expression" instruction if the, e.g. flag, to indicate that those instructions have been completed is not yet set, or skipping (omitting) those instructions if the flag or other indication to indicate that the common expression instruction has been completed by another thread is set.

The execution threads themselves could also or instead be configured to execute (or not execute) particular instructions in the shader program. For example, a thread could be denoted as being a thread that will (and should) execute instructions that correspond to common expressions (or vice-versa).

The execution threads can be caused to start their execution of the shader program at different starting points in the shader program in any suitable and desired manner.

For example, the execution threads could be initially issued to begin their execution at the beginning of the shader program, until one execution thread retires (completes the shader program), with any execution threads that are issued thereafter then being configured to start the shader program at a later start point (e.g. after the common expressions in the shader program). In this case, it would be possible to execute a single thread that starts at the beginning of the shader program, with all other threads starting at a or the later start point in the shader program and being blocked (or not issued) until the first thread has completed, or, alternatively, threads that start at the beginning of the shader program could be continuously issued until one thread completes, with threads issued thereafter then having a later start point. The completion of the shader program by a thread can be indicated in any appropriate and desired manner, e.g., by setting a flag.

In an embodiment, where the execution of instructions at later points in the shader program is dependent upon the completion of earlier instructions in the shader program, then rather than waiting for a first thread to complete the shader program before beginning execution of the threads that are to start later in the shader program, the completion of particular instructions or sets of instructions in the shader program by (earlier) threads is tracked and monitored, and when a thread completes a relevant instruction or set of instructions in the shader program, then threads that are to begin the shader program at a later start point are released for execution.

Thus, in an embodiment, instructions or groups of plural instructions in the shader program are indicated as being dependent upon the completion of earlier instructions in the shader program by a thread, and threads that start the shader program after the earlier instructions in the shader program (but before the instruction(s) or set(s) of plural instructions that are dependent upon those earlier instructions) are only allowed to begin executing the instruction(s) or set(s) of plural instructions in question once the earlier instructions have been completed by a thread.

The indication that the earlier instruction(s) have been completed can be provided as desired, e.g. by setting an appropriate indication, such as a flag, when the earlier instructions have been completed to indicate that the dependency has been met (such that the later instructions can then correctly be executed by threads that have not themselves completed the earlier instructions).

The dependencies of later instructions on earlier instructions could be tracked and used at any desired level of granularity (resolution) within the shader program.

For example, there could simply be a dependency that requires all the earlier instructions that will produce results that are needed for later instructions (such as, and in an embodiment, all the earlier instructions that relate to common expressions) to be completed before the dependencies are considered to be (and indicated as being) met.

Alternatively or additionally, the dependency could be set at the level of individual earlier instructions or sets of instructions that relate to, for example, individual common expressions (values) that those instructions are to derive, with later instructions that depend upon the particular common expression(s) in question then being allowed to be executed when the earlier common expression(s) in question has been completed.

For example, where the shader program is organised in terms of distinct (e.g. defined) groups of instructions (which groups may contain one or plural instructions), then respective such groups of instructions could be indicated as having a dependency upon an earlier instruction or group of instructions in the shader program (e.g. that evaluates a common expression), with execution of the later group of instructions being blocked for threads that have not executed the earlier instruction or group of instructions until a thread has executed the earlier instruction or group of instructions to generate the relevant result (data value or values) for that earlier instruction or group of instructions.

In an embodiment, there is a thread scheduler that monitors the completion of instructions of the shader program by threads, and that releases threads that are to start at later points in the shader program for execution when it observes that the relevant earlier dependencies for the thread or threads in question have been met.

In an embodiment, the execution of threads that are executing the instructions for common expressions in the shader program (and the execution of those instructions that execute the common expressions) are prioritised as the shader program is being executed, so as to try to produce the results of those common expressions as early as possible during the execution of the shader program for the set of threads in question. This will then help to ensure that any dependencies on the common expressions within the shader program can be met (i.e. the required results provided) earlier, and in an embodiment as early as possible, in execution of the shader program for the set of threads in question. The thread scheduler may be, e.g., and is in an embodiment, configured to prioritise execution and completion of the instructions that execute the common expressions in the shader program so as to achieve this. For example, in an embodiment the first thread that is executing the common expressions in the shader program is prioritised above the execution of other threads that are executing the shader program.

In one embodiment a single thread is issued for each work item (e.g. vertex, fragment or compute shader work item) that is to be processed, such that where plural parts of the shader program (e.g. a part or parts that include common expressions and a part that includes per work item expressions) are to be executed for the work item, a single thread that executes all the relevant instructions will be issued for the work item.

In another embodiment, it is possible to issue plural execution threads for a given work item. In this case, where plural parts of a shader program are to be executed for a work item, then in an embodiment plural execution threads are issued for the work item, e.g., and in an embodiment, one for each part of the shader program that is to be executed for the work item. Thus, for example, where the shader program is divided into plural parts (by having different start points within it), it is in an embodiment determined how many of the different parts of the shader program will need to be executed for a work item, and then one execution thread is issued for each part of the shader program that is to be executed for the work item. In this case, the plural threads in an embodiment start at the respective relevant start points for the parts of the shader program that they are to execute, and in an embodiment complete once they have completed the relevant part of the shader program.

Thus, in an embodiment, the shader program is, in effect, divided into plural parts, each part being between a respective pair of entry (start points) within the shader program, and respective execution threads are issued for a given work item for each part of the shader program that is to be executed for the work item in question.

The shader program is in an embodiment divided into (at least) a first part that contains instructions for common expressions within the shader program, and a second part that contains instructions for expressions that need to be executed for each work item individually.

In one embodiment, the shader program is divided into three parts, a first part that contains instructions that execute expressions that are common to all the work items that the shader program is to be executed for, a second part that contains instructions that execute expressions that are common to respective work groups of work items that the shader program is to be executed for, and a third part that contains instructions that execute expressions that are to be executed for each work item individually.

Correspondingly, in an embodiment, in dependence upon which of the parts of the shader program need to be executed for a work item, either one execution thread that executes the per work item instructions, or two execution threads (one that executes the per work group common expression instructions and one that executes the per work item instructions), or three execution threads (one that executes the global common expression instructions, one that executes the work group common expression instructions, and one that executes the per work item expression instructions are issued for execution of the shader program for a work item that the shader program is to be executed for.

The results (data value(s)) that are generated by execution of the common expressions in the shader program should be, and are in an embodiment, made available for use to other threads that are executing the shader program (and in particular to other threads that start the shader program at a later point and thus do not themselves execute the instructions for the common expressions in question). These common expression results (data values) can be provided for use for other execution threads in any suitable and desired manner. In an embodiment the results are stored so as to be accessible to other execution threads that are executing the shader program.

The common expression results (data values) could be stored in any suitable storage that is accessible to the graphics processing pipeline. Thus they could, for example, be stored appropriately in memory, with load operations (instructions) to load those values from memory for threads then being used to load those values when they are required for other threads and later expressions in the shader program. However, in an embodiment, the results (data values) that are generated by the common expressions in the shader program are stored in appropriate local storage of the graphics processing pipeline, such as a cache, and in an embodiment in registers of the graphics processing pipeline. The data values are in an embodiment stored in appropriate local storage, e.g. and in an embodiment registers, that are shared by all the threads that are executing the shader program, so that those values are available for use by other threads for later parts of the shader program without the need to load them from other memory.

Thus the results of the constant expressions could be stored in memory and then loaded for each thread, or they could be stored in local storage such as registers or a cache, with the threads then reading them directly from the, e.g., and in an embodiment, register file.

Where the results from the common expressions are stored in local storage, e.g. registers, then in one embodiment that data is also stored to memory as well as in the local storage, e.g. registers, so that the data can, if necessary, be reloaded from the main memory if the data values are needed again but are not longer available in the local storage, e.g. registers. Thus, in these embodiments, the common expression data writes will be coherent. In this case, it is in an embodiment also recorded (e.g. by setting a flag) that the common expression data values are available in memory for reuse if required.

Alternatively, the common expression results (data values) could solely be stored in local storage, and if those data values have to be discarded, but are required again, then they are in an embodiment recalculated, e.g. by issuing a thread or threads that will execute the common expressions again. (Discarding the earlier common expression results is acceptable in this situation, because re-executing the common expressions will produce the same data values.) Thus in another embodiment, the results of the common expressions are kept in local storage, e.g. registers, but are not written back to other, e.g. main, memory.

As will be appreciated by those skilled in the art, the graphics processing unit of the technology described herein will be part of an overall graphics processing system that will include, e.g., and in an embodiment, a host processor that, e.g., executes applications that require graphics processing by the graphics processing unit. The host processor will send appropriate commands and data to the graphics processing unit to control it to perform graphics processing operations and to produce graphics processing (render) output required by applications executing on the host processor. To facilitate this, the host processor should, and in an embodiment does, also execute a driver for the graphics processing unit and a compiler or compilers for compiling shader programs to be executed by the programmable execution unit of the graphics processing unit.

The graphics processing unit may also comprise, and/or be in communication with, one or more memories and/or memory devices that store the data described herein, and/or the output data generated by the graphics processing unit, and/or store software for performing the processes described herein. The graphics processing unit may also be in communication with a host microprocessor, and/or with a display for displaying images based on the data generated by the graphics processing unit.

The programmable execution unit(s) of the graphics processing unit that executes the shader program(s) may, and in an embodiment does, function (operate) as (the graphics processing pipeline may include) any suitable and desired graphics processing shader stage (shaders), such as a vertex shader, a geometry shader, fragment shader, compute shader, etc. In an embodiment it can operate as each of these shaders.

The programmable execution unit of the graphics processing unit may comprise any suitable programmable hardware element such as programmable processing circuitry. Each programmable processing stage may comprise a separate circuit element to other programmable stages of the processing pipeline or the programmable processing stages may share some or all of their programmable processing circuitry (that is then differently programmed to serve as the desired programmable processing stage).

As well as any programmable processing (shader) stages, the graphics processing pipeline may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a graphics processing pipeline may be used to generate, such as frames for display, render-to-texture outputs, etc. The output, e.g. fragment shaded, data values from the graphics processing are in an embodiment exported to external, e.g. main, memory, for storage and use, such as to a frame buffer for a display.

The technology described herein is applicable to any suitable form or configuration of graphics processor. It is particularly applicable to tile-based graphics processors and graphics processing systems. Thus in an embodiment, the graphics processing system and graphics processing pipeline are a tile-based system and pipeline, respectively.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may comprise a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the data processing system and pipeline can otherwise include any one or more or all of the usual functional units, etc., that data processing pipelines include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 1 shows a typical computer graphics processing system.

An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processing pipeline 3 of the present embodiment in more detail.

The graphics processing pipeline 3 shown in FIG. 2 is a tile-based renderer and will thus produce tiles of a render output data array, such as an output frame to be generated.

(In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may typically be an output frame intended for display on a display device, such as a screen or printer, but may also, for example, comprise intermediate data intended for use in later rendering passes (also known as a "render to texture" output), etc.

(When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 3 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include the creation of one or more intermediate representations of the program within the compiler. (The compiler may, e.g., be part of the driver 4, with there being a special API call to cause the compiler to run. The compiler execution can thus be seen as being part of the draw call preparation done by the driver in response to API calls generated by an application. The driver will then issue the compiled program(s) to the graphics processing unit 3 for execution by the programmable processing stage(s) of the graphics processing unit.)

FIG. 2 shows schematically the operation stages of the graphics processing unit 3.

FIG. 3 shows the corresponding functional units of the graphics processing unit 3 that are used to perform (and thus to act as) various ones of the processing operations and stages of the graphics processing pipeline shown in FIG. 2. (There may be other functional units in the graphics processing unit 3. FIG. 3 shows those functional units that are relevant to operation in the manner of the technology described herein only for simplicity.)

As shown in FIG. 3, the graphics processing unit 3 includes a rasteriser 40, a thread spawner 41, a programmable execution unit 42, a varying interpolator 43, a texture mapper 44, a blender 45, and a set of registers 46.

The thread spawner 41 is operable to spawn execution threads for execution by the programmable execution unit 42, e.g. for fragments that it receives from the rasteriser 40. It may include execution thread issuing circuitry, such as a scheduler (scheduling circuitry), to control the issue of threads for execution by the programmable execution unit.

The programmable execution unit 42 operates to execute shader programs to perform the shader operations of the graphics processing pipeline, such as the hull shader, the vertex shader and the fragment shader. To do this, it receives execution threads from the thread spawner 41 and executes the relevant shader program for those execution threads. As part of this operation, and as shown in FIG. 3, the execution threads will read data from and write data to respective registers 46.

As part of this processing, and as shown in FIG. 3, the programmable execution unit 42 can call upon the varying interpolator 43, the texture mapper 44 and the blender 45 to perform specific graphics processing operations. To do this, the programmable execution unit will send appropriate messages to the relevant accelerator (and receive the appropriate response therefrom), e.g. in response to specific instructions in a shader program that it is executing.

The varying interpolator 43 operates to interpolate values across graphics primitives, and, as part of this operation, often creates texture coordinates to be used for sampling graphics textures.

The texture mapper 44 operates to sample graphics textures using texture coordinates, e.g. generated by the varying interpolator 43, and produces therefrom a filtered texture sample result (which it can then return to the programmable execution unit 42 for use, e.g. when shading sampling points).

The blender 45 operates to blend, e.g., fragment shading results generated by the programmable execution unit 42 with previously generated fragment shader results, such as results that are already stored in the tile buffer and/or the frame buffer.

As discussed above, the programmable execution unit 42 executes shader programs to be executed for execution threads that it receives from the thread spawner 41 to perform graphics processing operations.

A number of embodiments for the execution of shader programs by execution threads in the programmable execution unit 42 will now be described with reference to FIGS. 4 to 11.

In these embodiments, threads can begin their execution of a shader program at different start points within the shader program, in accordance with the technology described herein.

As discussed above, the Applicants have recognised in this regard that many shader programs may contain expressions that will produce the same result for plural threads that execute the shader program as well as expressions that will need to be executed independently for each thread that executes the shader program.

FIG. 4 shows an example of this in a shader program. FIG. 4 shows an exemplary fragment shader 50, which can be divided into two distinct workloads, a set of expressions 51 in the fragment shader program 50 that will produce the same results for each execution thread (and thus can be thought of as a "cross-thread-common sub-expression" (CT-CSE) workload 51), and a set of expressions 52 that need to be executed independently for each fragment, and thus can be considered to be a "per fragment" workload 52.

Thus, as shown in FIG. 4, the compiler can compile the shader program 50 into two distinct workloads, a "common expression" workload 51 and a "per fragment" workload 52 (with a temporary uniform value ("uniform temp") being used to store the result(s) of the common expression workload 51 for use for each fragment when the relevant per fragment workload expressions 52 are executed).

Then, when executing the so-compiled shader program, a single thread, for example, can be configured to execute both the common expressions 51 and the per fragment expressions 52, but with the other threads only executing the per fragment expressions 52 (and using the result(s) from the thread that executed the common expressions 51). This then helps to reduce or avoid repeated execution of the common expressions 51 for plural execution threads.

Figure 5:
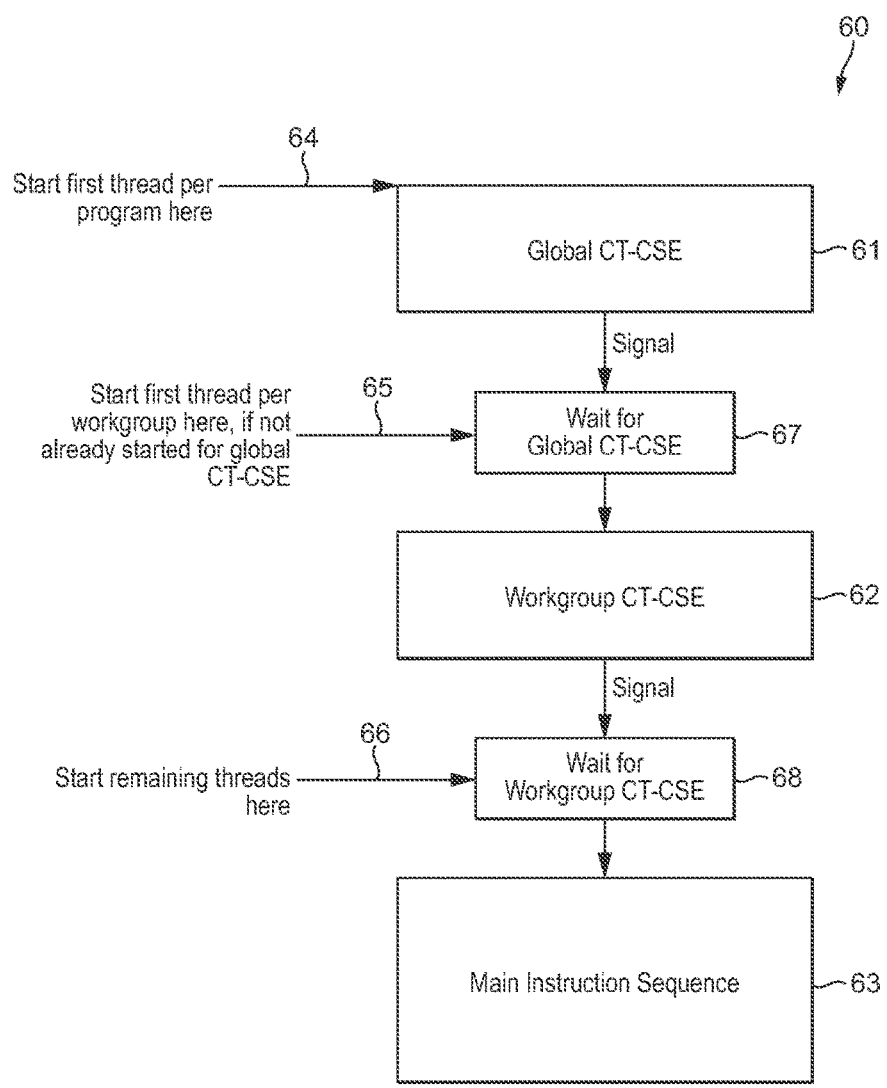
FIG. 5 shows an example of a shader program configuration in an embodiment of the technology described herein.

FIG. 5 shows another example of a shader program 60 that is configured in accordance with the technology described herein. In this case, the sequence of instructions for shader program 60 includes an initial set of instructions 61 to perform "global" common expressions (i.e. that will produce the same result for all threads (work items) of a set of threads (work items) that the shader program is to be executed for) of the shader program and to store the results of those expressions in the registers 46.

There is then a set of instructions 62 in the shader program that perform expressions that are common to (will produce the same result(s) for) a given work group within the set of work items that the shader program is to process, and that again store the results of those expressions in the registers 46. Finally, the shader program includes its main instruction sequence 63 that needs to be executed independently for each thread (work item).

As shown in FIG. 5, threads are able to start executing the shader program either at the beginning of the global common expressions 64, or at the beginning of the work group common expressions 65, or at the beginning of the main instruction sequence 66.

Thus, in an embodiment when executing the shader program 60, as shown in FIG. 5, the first thread of the first work group of a set of threads that the program 60 is to be executed for will start executing the shader program at the beginning of the global common expression instructions 64, the first thread for each remaining work group will start after the global common expression instructions and before the beginning of the work group common expressions 65, and any remaining threads will be started at the beginning 66 of the main instruction sequence 63.

As shown in FIG. 5, any threads which are to start their execution after the beginning of the shader program are blocked (wait) 67, 68 until the relevant common expression results have become available by a thread executing the previous set of common expression instructions. Once it has been signalled that the relevant set of common expressions have been completed by a thread, then threads that have a later start point in the shader program execution are allowed to begin executing at their start point.

Figure 6:
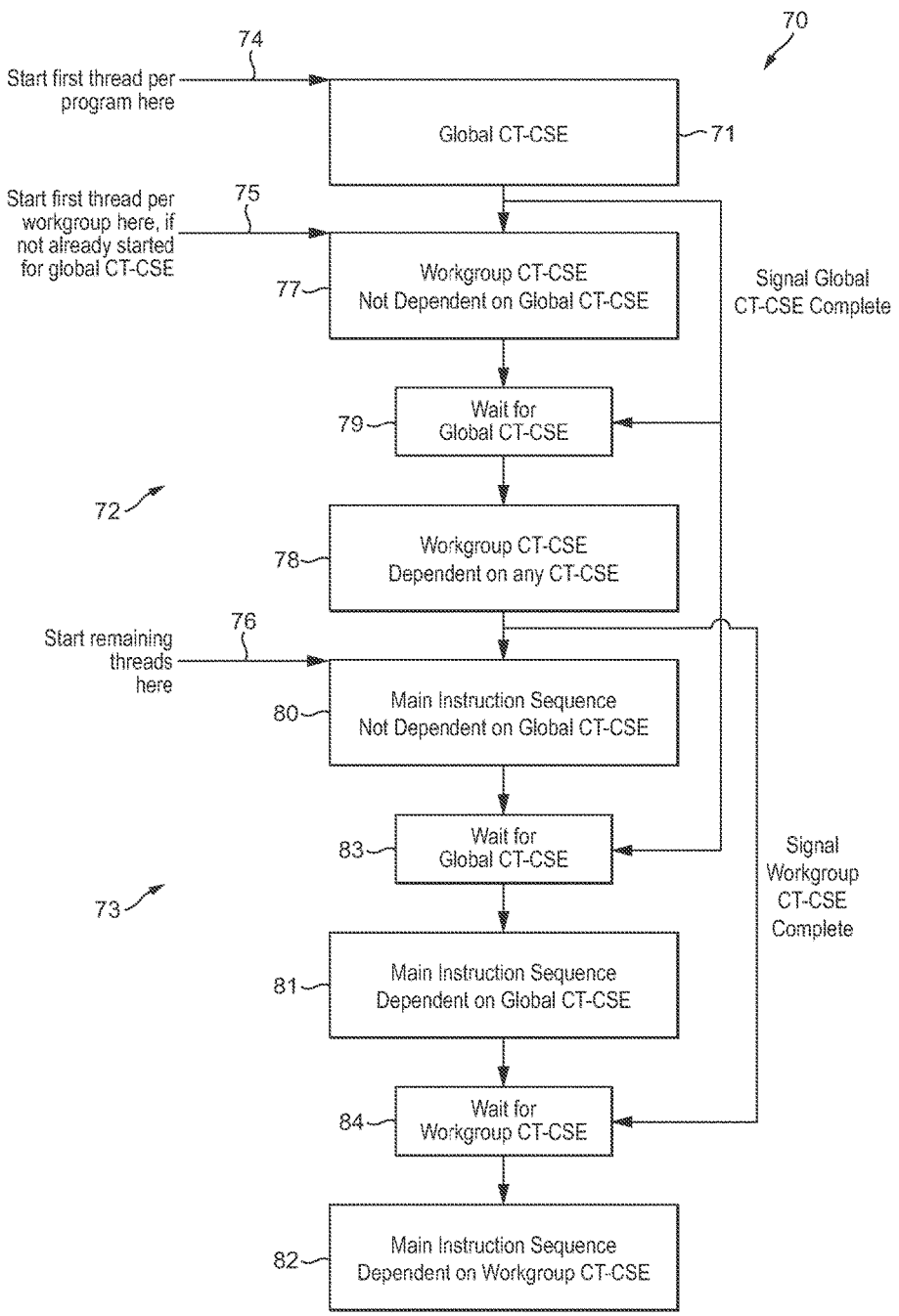
FIG. 6 shows an example of a shader program configuration in another embodiment of the technology described herein.

FIG. 6 shows a shader program 70 that is arranged similarly to the shader program shown in FIG. 5, and thus has at its beginning a set of instructions 71 that execute "global" common expressions followed by a set of instructions 72 that execute per work group common expressions, and then finally a main instruction sequence 73, with corresponding start points at the beginning of the shader program 74, at the beginning of the work group common expressions 75 and at the beginning of the main instruction sequence 76.

However, as shown in FIG. 6, the set of instructions for the work group common expressions 72 and the main instruction sequence 73 are further subdivided into sets of instructions that are dependent upon earlier common expressions in the shader program, and that are not dependent on earlier common expressions in the shader program.

Thus, as shown in FIG. 6, the set of instructions 72 that execute "work group" common expressions is divided into a first set of instructions 77 that are not dependent upon the global common expression instructions 71, and a second set of work group common expression instructions 78 that are dependent upon the results of the global common expressions 71, with the "wait" point 79 that acts to block the execution of threads until the global common expression instructions 71 have been completed being arranged after the work group common expression instructions 77 that are not dependent upon the global common expressions 71.

This then has the effect of allowing any threads that start at the beginning of the work group common expressions 75 to begin executing the work group common expression instructions 77 that are not dependent upon the global expressions 71 before execution of the global expression instructions 71 have been completed. This can then mean, for example, that by the time those threads reach the "wait" point 79, the global common expressions 71 may have been completed, so that the threads in practice need never stall.

Correspondingly, the main instruction sequence 73 is divided into instructions 80 that are not dependent on any of the common expressions, instructions 81 that are dependent on the global common expressions 71, and instructions 82 that are dependent on the work group common expressions 72, with there being corresponding wait points 83, 84 where threads will, if necessary, be stalled until the relevant set of common expressions that the subsequent main instructions are dependent upon have been completed.

Again, this then potentially allows threads that start at the beginning 76 of the main instruction sequence to being executing instructions before the common expressions have been completely executed (and potentially such that there is no need to stall the execution of any of those threads).

In this Figure, solid black lines show thread execution paths, and dotted lines show cross-thread control signalling. Thus, as can be seen, when a thread completes the global expressions 71, that will be signalled to the wait points 79, 83, so that any threads that reach or are stalled at those points can then be allowed to continue their execution. Correspondingly, when a thread completes the work group common expressions 72, that is signalled to the wait point 84 to allow any threads that reach or are stalled at that point to continue their execution of the main instruction sequence.

The shader compiler is arranged to, when it compiles a shader program, generate the instruction sequence for the compiled program so as to (as far as possible) have the order and arrangement shown in FIG. 6.

Figure 7:
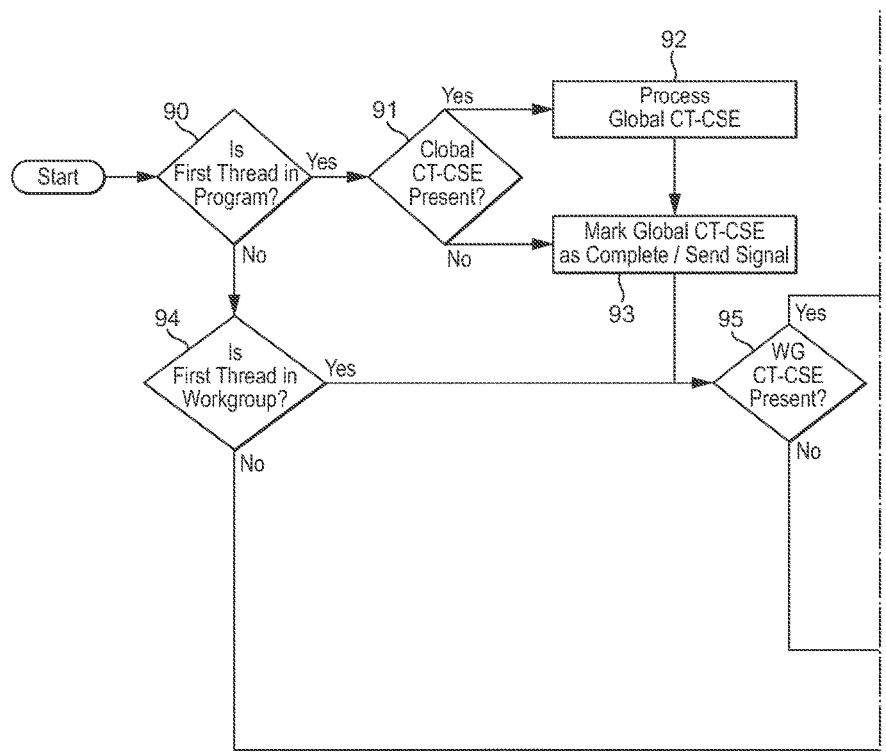
FIG. 7 shows schematically the execution of threads in the embodiment shown in FIG. 6.
Figure 7:
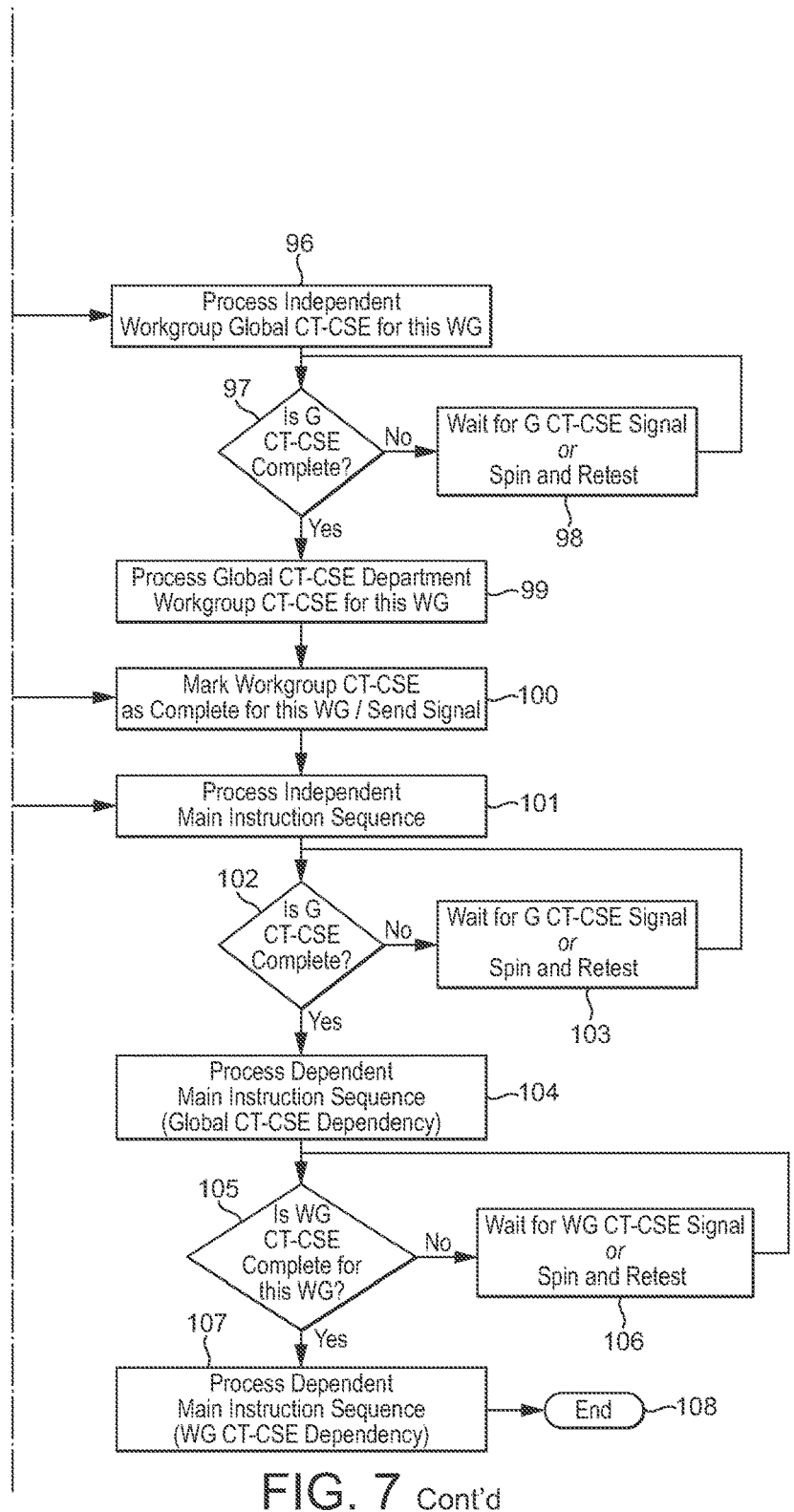

FIG. 7 is a flowchart showing the execution of threads for the shader program arrangement shown in FIG. 6. In this embodiment, a single thread is spawned for each work item (e.g. vertex, fragment or compute work item) that the shader program is to be executed for, and each thread follows the flowchart shown in FIG. 7. (Thus in this embodiment, the same thread will, if appropriate, execute the global common expressions, the work group common expressions and the actual main instruction sequence for a given work item.)

(FIG. 7 shows the thread execution flow only. For ease of illustration, the other graphics processing unit work that will be required to complete processing of the work item, such as rasterisation, depth/stencil testing, blending, etc., is not shown in FIG. 7.)

As shown in FIG. 7, when a thread is issued, it is first determined whether the thread is the first thread to execute the shader program in question (step 90). If it is determined that the thread is the first thread to execute the shader program, it is then determined whether there are any global common expressions present in the shader program (step 91). If so, the thread executes the instructions for those global common expressions (step 92).

Once the thread has completed the global common expressions at step 92, the system then marks that those global common expressions have been complete (or correspondingly sends a signal to indicate that) (step 93).

Correspondingly if at step 91 it is determined there are no global common expressions in the shader program, then it is immediately marked (and/or signalled) that those expressions are complete (step 93).

On the other hand, if at step 90 it is determined that the thread is not the first thread in the program, it is then determined if the thread being executed is the first thread in its work group (step 94). If it is determined that the thread is the first thread in its work group, then it is then determined whether there are any work group common expressions in the shader program (step 95).

As shown in FIG. 7, the process correspondingly proceeds to step 95 for the first thread for a program once that thread has completed the global common expressions (or it is determined for that thread that there are no global common expressions present).

If at step 95 it is determined that there are work group common expressions, then the thread executes the instructions for the work group common expressions that are not dependent upon the common expressions (step 96). The thread then waits (if necessary) for the global common expressions to be completed (steps 97 and 98), and once they are, then executes the instructions for the work group common expressions for the work group in question that are dependent upon the global common expressions (step 99).

Once the work group common expressions that are dependent upon the global common expressions have been completed, the work group common expressions are marked as complete (or otherwise signalled as such) (step 100).

As shown in FIG. 7, the work group common expressions are correspondingly marked and/or signalled as being complete if at step 95 it is determined that there are no work group common expressions present in the shader program.

On the other hand, if at step 94 it is determined that the thread is not the first thread in the work group, then the thread proceeds to execute the instructions in the main instruction sequence that are independent of any of the common expressions in the shader program (step 101).

Correspondingly, as shown in FIG. 7, once a thread has completed the work group common expressions it then proceeds to execute the instructions in the main instruction sequence that are not dependent on any of the common expressions (step 101).

Once a thread has completed the instructions in the main instruction sequence that are independent of the common expressions, it then waits (if necessary) until the global common expressions have been completed (steps 102 and 103). Once the global common expressions have been completed, the thread executes the instructions in the main instruction sequence that are dependent upon the global common expressions (step 104). The thread again then waits (if necessary) for the work group common expressions to be completed (steps 105 and 106), and once those instructions have been completed, it executes the remaining main instruction sequence instructions that are dependent upon the work group common expressions (step 107).

Thread execution is then complete (step 108).

This is repeated for each thread that the shader program is to be executed for.

In this process, the threads that execute the common expression instructions save their results to appropriate registers 46, so that those results are then available for later threads (that have not themselves executed the common instructions) when they execute the relevant instruction sequence(s). Other arrangements, such as saving the common expression results out to main memory and then reloading those results for later threads would be possible, if desired.

Figure 8:
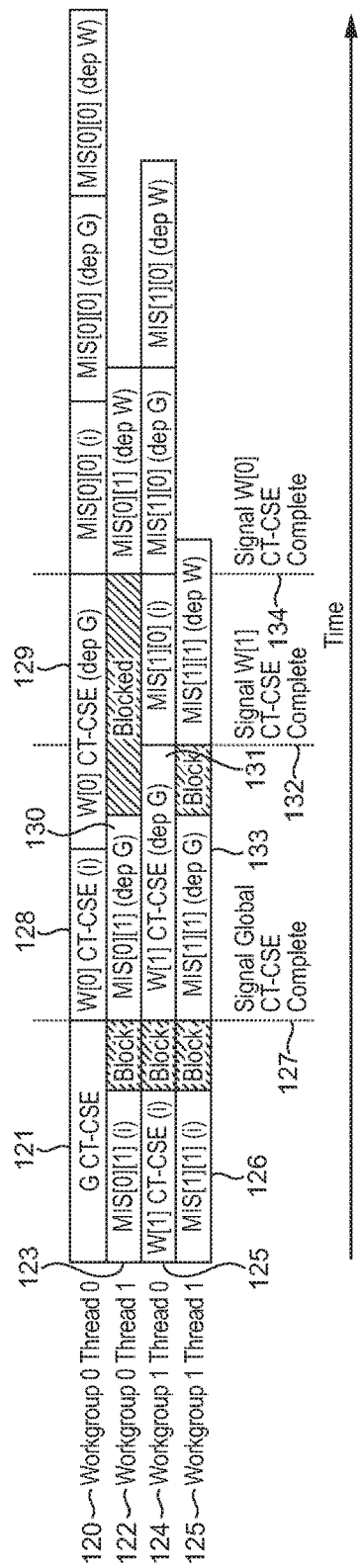
FIG. 8 shows an example of the timing of execution of threads in the embodiment shown in FIGS. 6 and 7.

FIG. 8 shows the timing of execution of instructions by exemplary threads in the embodiment shown in FIGS. 6 and 7.

In FIG. 8, the rows represent threads of execution, and time increases from left to right. W[x] indicates work group number x, MIS [x][y] indicates the main instruction sequence for a given work item (x is work group number, y is work item number), (i) indicates independent instruction sequence, (dep G) indicates an instruction sequence that is dependent on the global common expressions (global CT-CSE) and (dep W) indicates the instruction sequence that is dependent on work group common expressions (work group CT-CSE).

FIG. 8 shows the execution of a job consisting of two work groups, each containing two work items (one work item mapping to one hardware thread).

FIG. 8 shows the timing of execution of the threads for this job in a graphics processing unit that allows concurrent execution of dependent workloads, using a multithreaded execution unit. It will be appreciated here that the execution timing shown in FIG. 8 is exemplary only, and thread scheduling may for example, result in different timings to those shown in FIG. 8. (For example, FIG. 8 assumes that all four threads are able to start their execution at the same time.)

As shown in FIG. 8, the first thread 120 in the first work group starts by executing the global common expressions 121.

The second thread 122 of the first work group correspondingly starts executing the instructions 123 of the main instruction sequence for that work group that are not dependent upon the execution of any of the common expressions in the shader program. As shown in FIG. 8, the execution of this second thread is blocked once those "independent" instructions has been completed.

The first thread 124 from the second work group correspondingly starts executing the work group common expressions 125 for the second work group that are independent of the global expressions. Again, further execution by that thread is blocked once those work group common expressions that are independent of the global expressions have been completed.

The second thread 125 for the second work group correspondingly begins executing the instructions 126 in the main instruction sequence that are independent of any of the common expressions. Again, that thread's execution is stalled once it completes the execution of those "independent" instructions.

When the first thread 120 completes the global common expressions 121, that event is signalled 127 to the other threads, and the thread 120 begins to execute (the instructions for) the common expressions 128 for the first work group that are independent of the global common expressions 121, followed by the common expressions 129 for that work group that are dependent upon the global expressions 121.

Correspondingly, the second thread 122 for the first work group is released to execute the main instruction sequence instructions 130 that are dependent upon the global common expressions (which have now been completed by the first thread 120). Again, the execution of that thread is stalled once those instructions have been executed.

The first thread 124 of the second work group correspondingly executes the instructions 131 for the common expressions for the second work group that are dependent upon the global expressions 121 (as those expressions have now been completed).

Once the first thread 124 of the second work group has completed the work group common expressions 131 that are dependent upon the global expressions 121, that event is signalled 132 to the other threads.

The second thread 125 for the second work group is correspondingly allowed to execute the main instruction sequence instructions 133 that are dependent upon the global common expressions, and then waits until the first thread 124 of the second work group has completed the common expressions 131 for that work group that are dependent upon the global expressions 121.

Then, as shown in FIG. 8, once the first thread in the second work group has completed all the common expressions for that work group, both threads 124 and 125 for the second work group complete any remaining processing of the main instruction sequence instructions.

Correspondingly, once the first thread 120 for the first work group has completed execution of all the common work group common expressions for that work group, that event is signalled 134, and the first and second threads 120, 122 for the first work group then, as shown in FIG. 8, complete the execution of any remaining main instruction sequence instructions that they have left to execute.

Figure 9:
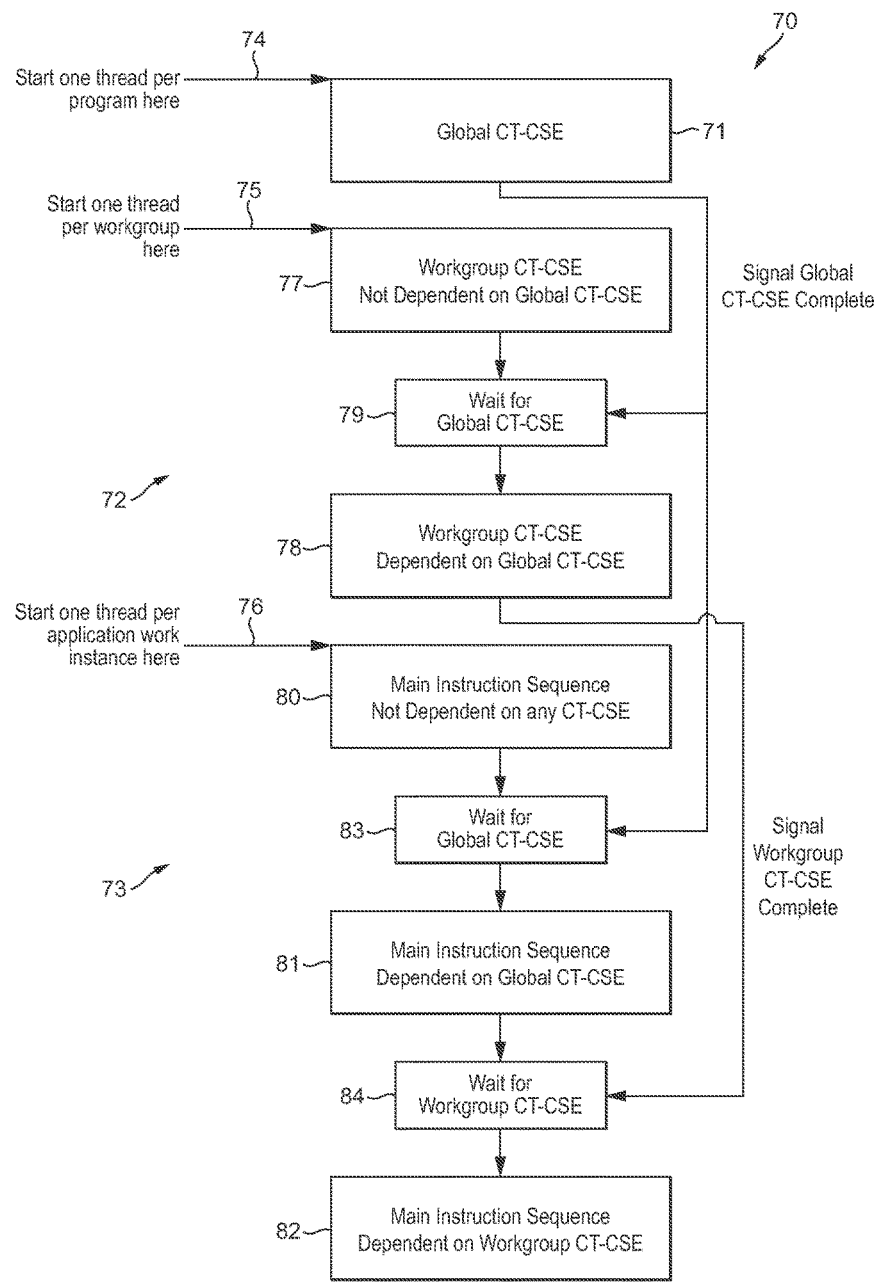
FIG. 9 shows an example of a shader program configuration in another embodiment of the technology described herein.

FIG. 9 shows another embodiment for executing a shader program whose instructions have been organised into a sequence corresponding to that shown in FIG. 6 (i.e. such that there is a set of instructions 71 to execute global common expressions, a set of instructions 72 to execute work group common expressions 72, which is divided into respective subsets of instructions, one subset 77 for work group common expressions that are not dependent on the global common expressions, and one subset 78 that executes work group common expressions that are dependent on the global common expressions 71, and then a main instruction sequence 73 which is again divided into three subsets, a first subset 80 of main instructions (i.e. per work item instructions) that are not dependent on any common expressions, a subset 81 of per work item instructions that are dependent upon the global common expressions, and a subset 82 of per work item instructions 82 that are dependent on the work group common expressions).

Again, in the arrangement shown in FIG. 9, threads can start execution at the beginning 74 of the instructions for the global common expressions 71, or at the beginning 75 of the work group common expression instructions 72, or at the beginning 76 of the main instruction sequence, per work item instructions 73.

In this Figure, solid black lines again show thread execution paths, and dotted lines show cross-thread control signalling. Thus, as can be seen, when a thread completes the global expressions 71, that will be signalled to the wait points 79, 83, so that any threads that reach or are stalled at those points can then be allowed to continue their execution. Correspondingly, when a thread completes the work group common expressions 72, that is signalled to the wait point 84 to allow any threads that reach or are stalled at that point to continue their execution of the main instruction sequence.

The shader compiler is arranged to, when it compiles a shader program, generate the instruction sequence for the compiled program so as to (as far as possible) have the order and arrangement shown in FIG. 9.

As discussed above, in the execution of the shader program shown in FIGS. 6, 7 and 8, a single thread is spawned and executes the shader program for each work item (e.g. vertex, fragment, or compute work item). Thus if the work item in question is to execute all of the shader program, there will be a single thread for that work item that executes the entire shader program.

In the embodiment shown in FIG. 9, instead of a single thread executing all the relevant parts of the shader program for a given work item (i.e. such that if a work item is to execute any of the common expressions in the shader program, then the same single thread for the work item will execute both those common expressions and the per-work item main instruction sequence), if a work item is to execute any of the common expressions in the shader program, plural threads are spawned and issued for the work item, one thread for each respective subpart of the shader program execution that is to be executed for the work item in question.

Thus if the entire shader program is to be executed for a work item, three threads will be spawned and issued for the work item to execute the shader program, one that executes the global common expressions 71 and thus that starts at the beginning 74 of those expressions, one that executes the work group common expressions 72 (and thus that starts its execution at the beginning 75 of those work group common expressions), and one thread that executes the main, per work item instruction sequence instructions 73 and thus that starts at the beginning 76 of those per work item instructions.

Correspondingly, if the work group common expressions and the main instruction sequence are to be executed for a work item, then two threads will be spawned, one to execute the work group common expressions 72 and one to execute the per work item main instruction sequence 73. Finally, if it is only necessary to execute the per work item main instruction sequence 73 for a work item, then a single thread to execute those instructions will be spawned and issued for the work item.

This arrangement of spawning and executing multiple threads of execution where a work item is to execute more than one "part" of the shader program allows greater parallelisation of the execution for the work item in question, as the non-dependent workloads in all the work group common expressions and all per work item instructions can (potentially) run in parallel, for example. It may also facilitate more straightforward completion of the execution of the common expression instructions, as that can be indicated by means of thread completion (because the relevant thread will complete its execution when it completes the relevant part of the shader program that it is executing), rather than, e.g., having to signal that a thread has reached the relevant point in the instruction sequence without the thread actually completing (retiring).

Figure 10:
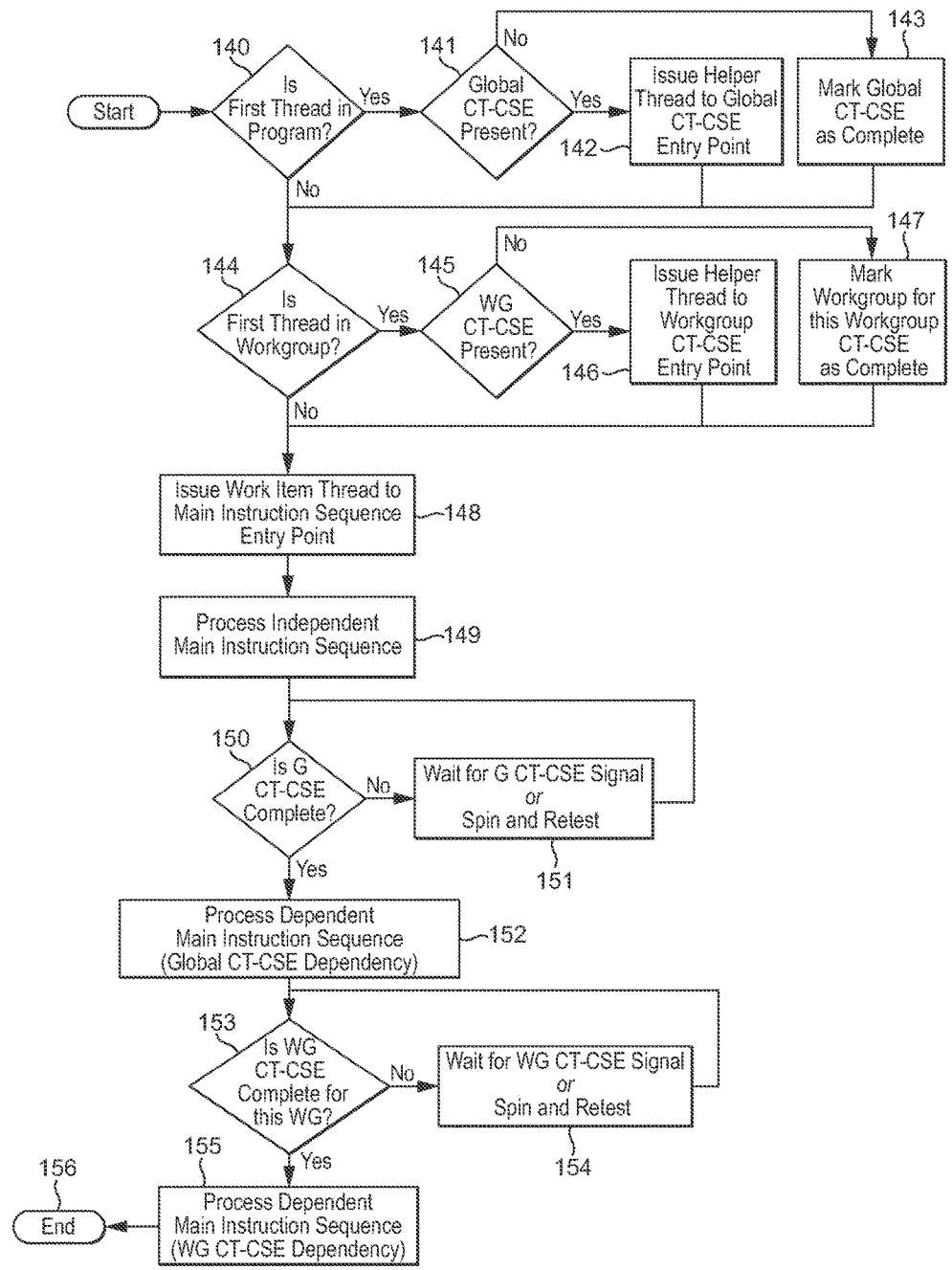
FIG. 10 shows schematically the execution of threads in the embodiment shown in FIG. 9.

FIG. 10 is a flowchart that shows the spawning and execution of threads in the arrangement shown in FIG. 9.

The flowchart for FIG. 10 is executed once per work item (vertex, fragment, compute work item). As can be seen, up to three hardware threads for execution may be spawned in the execution unit for a given work item.

(FIG. 10 again shows the thread execution flow only. For ease of illustration, the other graphics processing unit work that will be required to complete processing of the work item, such as rasterisation, depth/stencil testing, blending, etc., is not shown in FIG. 10.)

As shown in FIG. 10, the first step in the process is to determine whether the thread being executed is the first thread that is executing the shader program (step 140). If so, it is then determined whether there are any instructions that execute global common expressions in the shader program (step 141). If so, a first thread for the work item in question is issued to start executing the shader program at the global common expressions shader program start (entry) point (step 142). That thread will then execute the instructions 71 for the global common expressions and once it has completed its processing of those instructions that is signalled and the thread retired.

If it is determined at step 141 that there are no global common expressions present in the shader program, then the global common expressions are marked as complete (step 143).

As shown in FIG. 10, if it is determined that the thread is not the first thread to execute the program at step 140 or once the relevant "helper" thread has been issued at step 142, it is then determined whether the thread is the first thread to be executed for its work group (step 144). If so (thereby indicating that the work group common expressions, if any, need to be executed for the work item in question), it is then determined whether there are any common expressions for the work group in question present in the shader program (step 145).

If it is determined that there are common expressions for the work group in the shader program, then a second helper thread is issued for the work item to execute the work group common expressions in the shader program (step 146). That thread then executes the work group common expressions in the shader program for the work group in question and once it has completed its processing of those common expressions that is signalled and the thread retires.

On the other hand, if at step 145 it is determined that there are no work group common expressions present in the shader program, then the work group common expressions for the work group in question are marked as complete (step 147).

If it is determined at step 144 that the thread is not the first thread in the work group, or once the helper thread to execute the work group common expressions has been issued at step 146, a thread is issued for the work item to execute the work item main instruction sequence of the shader program (step 148). That thread enters the shader program at the beginning of the work item main instruction sequence in the shader program and first executes the main instruction sequence instructions 80 that are not dependent upon any of the common expressions in the shader program (step 149).

Once the thread has completed the non-dependent instructions in the main instruction sequence, it then waits (if necessary) until the global common expression instructions have been completed (steps 150, 151) (e.g. for the relevant helper thread to complete those instructions), and then proceeds to execute the per work item main instruction sequence instructions that are dependent upon the global common expressions (step 152).

Again, when the thread has completed the main instruction sequence instructions that are dependent upon the global common expressions, it then waits (if necessary) until the work group common expressions have been completed (steps 153 and 154), before executing the per work item main instruction sequence instructions that are dependent upon the per work group common expressions (step 155).

The thread's execution is then complete (step 156).

This is repeated for each work item that the shader program is to be executed for.

In this process, the threads that execute the common expression instructions save their results to appropriate registers 46, so that those results are then available for later threads (that have not themselves executed the common instructions) when they execute the relevant instruction sequence(s). Other arrangements, such as saving the common expression results out to main memory and then reloading those results for later threads would be possible, if desired.

Figure 11:
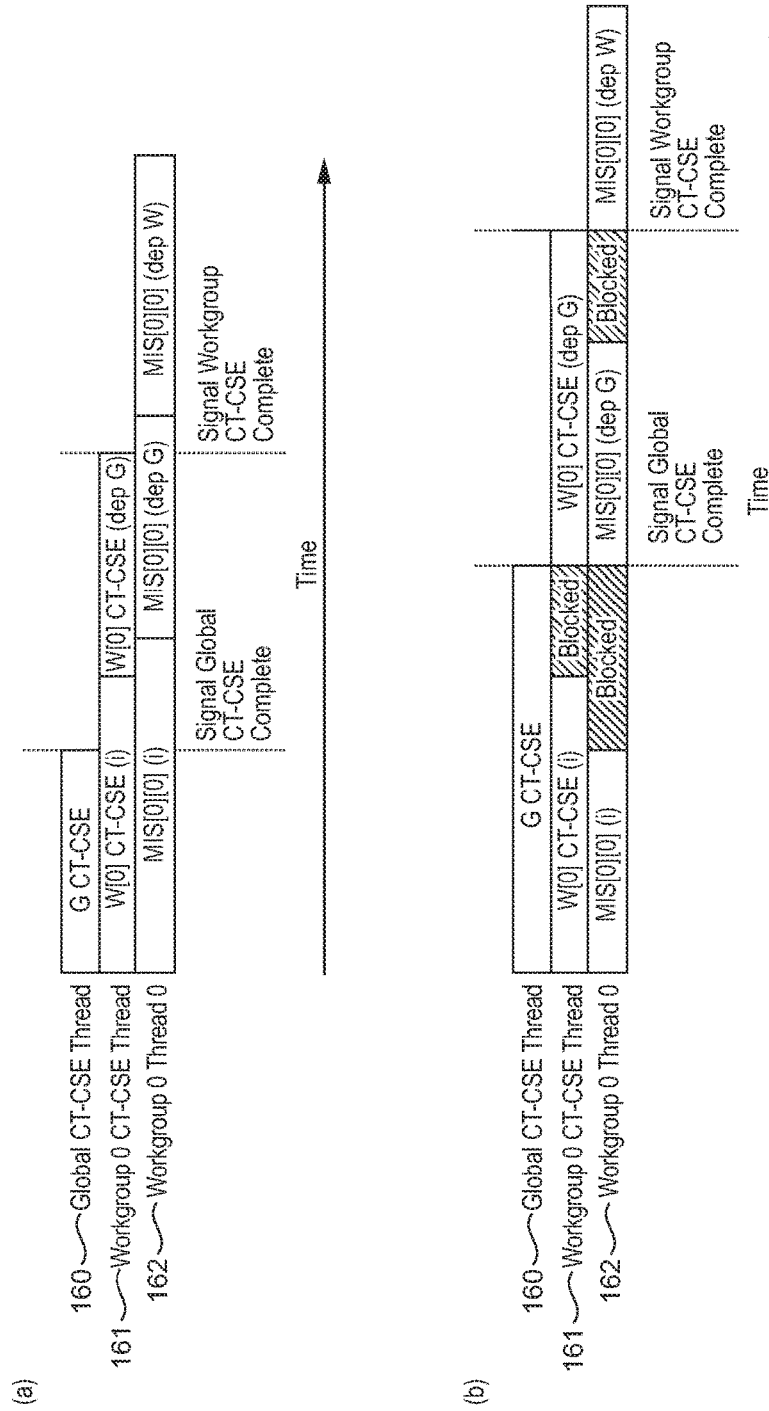
FIG. 11 shows an example of the timing of execution of threads in the embodiment shown in FIGS. 9 and 10.

FIG. 11 shows corresponding exemplary timing diagrams for the execution of threads in the embodiment shown in FIGS. 9 and 10.

In FIG. 11, again the rows represent threads of execution, and time increases from left to right. W[x] indicates work group number x, MIS [x][y] indicates the main instruction sequence for a given work item (x is work group number, y is work item number), (i) indicates independent instruction sequence, (dep G) indicates an instruction sequence that is dependent on the global common expressions (global CT-CSE) and (dep W) indicates the instruction sequence that is dependent on work group common expressions (work group CT-CSE).

FIG. 11 again shows the timing of execution of the threads in a graphics processing unit that allows concurrent execution of dependent workloads, using a multithreaded execution unit. It will be appreciated again that the execution timing shown in FIG. 11 is exemplary only, and thread scheduling may for example, result in different timings to those shown in FIG. 11. (For example, FIG. 11 assumes that all four threads are able to start their execution at the same time.)

FIG. 11*a* shows the execution of a job consisting of a single work group consisting of a single work item, and for which the sizes of the different parts of the shader program are such that there are no stalls due to threads blocking and waiting for common expression results.

Thus as shown in FIG. 11*a*, for the work item to be processed three threads of execution will be issued, a first thread 160 for executing the global common expressions, a second thread 161 for executing the work group common expressions and a third thread 162 for executing the per work item instructions.

As shown in FIG. 11*a*, the thread 160 that is executing the global common expressions will when it completes executing those global instructions signal that event. Correspondingly, the thread 161 that is executing the work group common expressions will signal when it has completed those expressions. The third thread 162 will simply execute the main instruction sequence instructions.

As shown in FIG. 11*a*, each thread begins executing its relevant set of instructions at the same time, and because in this case there is no delay due to the threads blocking, they simply execute their instructions continuously until they have finished.

FIG. 11*b* shows the timing of execution for threads again where there is a single work item (and work group), but in this case the completion of the global common expressions by the thread 160 that is issued to complete those expressions takes longer than the completion of the non-dependent work group common expressions and the non-dependent per work item expressions. Thus, as shown in FIG. 11*b*, the thread 161 that is executing the work group common expression instructions and the thread 162 that is executing the per work item instructions are both stalled until the thread 160 that is executing the global common expression completes those instructions.

Once the thread 160 completes (i.e. it has signalled that the global common expressions have been completed), then the threads 160 and 162 continue their execution with the relevant instructions that are dependent upon the global common expressions, as shown in FIG. 11*b*.

Again, for illustration purposes it is assumed that the thread 162 that is executing the per work item instruction completes the per work item, main instruction sequence instructions that are dependent upon the global common expressions before the thread 161 that is executing the work group common expression instructions completes its execution of those work group common expressions. Thus the thread 162 is, as shown in FIG. 11*b*, stalled until the thread 161 completes the work group common expression instructions. Once the thread 161 completes (it is signalled that the work group common expression instruction execution has been completed), then as shown in FIG. 11*b*, the thread 162 executes the remaining per work item main instruction sequence instructions.

As will be appreciated from the above, the technology described herein, in its embodiments at least, can provide more efficient execution of a shader program. This is achieved, in embodiments of the technology described herein at least, by allowing execution threads to begin execution of the shader program at different points within the sequence of instructions of the shader program, and in particular by allowing some threads to begin execution of the shader program after instructions that execute common expressions in the shader program.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing pipeline which includes a programmable shading stage that executes instructions to perform shading operations, the method comprising:

when the shader stage is to execute a shader program to perform shading operations for a type of work item, the shader program comprising a sequence of instructions to be performed when executing the shader program:

issuing plural execution threads to the shader stage for which the shader program is to be executed for execution;

wherein:

the issuing of the execution threads to the shader stage for execution of the shader program is configured such that the execution of the shader program can be started at different instructions within the sequence of instructions for the shader program for different ones of the execution threads for the same type of work item; and executing the shader program for the execution threads;

wherein:

executing the shader program for the execution threads comprises:

executing the shader program for one or more of the execution threads starting at a first point in the sequence of instructions for the shader program; and concurrently executing the shader program for another one or ones of the execution threads starting at a different point in the sequence of instructions for the shader program.

2. The method of claim 1, wherein:

execution threads for which the shader program is to be executed are able to start execution of the shader program at the start of the shader program and to start concurrent execution of the shader program after at least some instructions in the shader program that calculate common expressions in the shader program.

3. The method of claim 1, wherein:

execution threads are able to start concurrent execution of the shader program after instructions that execute expressions in the shader program that are common for a subset of a set of execution threads that the shader program is being executed for.

4. The method of claim 1, wherein:

the instructions for any shader program expressions that will produce a common result for all the threads of a set of threads that the shader program is to be executed for are earlier in the sequence of instructions for the shader program than any instructions for shader program expressions that are required to be executed for each thread individually.

5. The method of claim 1, wherein:

the shader program includes instructions that execute shader program expressions that will produce a common result for all the threads of a set of threads that the shader program is to be executed for; and instructions that execute expressions that need to be executed for each thread individually, but which are not dependent upon the results of the instructions that execute common expressions in the shader program; and execution threads for which the shader program is to be executed are able to start their concurrent execution of the shader program after the instructions in the shader program that execute the common expressions in the shader program but before the beginning of the instructions that execute expressions that need to be executed for each thread individually, but which are not dependent upon the results of the instructions that execute common expressions in the shader program.

6. The method of claim 1, comprising:

issuing a single thread for a work item that the shader program is to be executed for.

7. The method of claim 1, comprising:

issuing plural threads for a work item that the shader program is to be executed for, with each thread starting its execution of the shader program at a different instruction within the sequence of instructions for the shader program.

8. The method of claim 1, comprising:

tracking the completion of particular instructions or sets of instructions in the shader program by execution threads; and releasing threads that are to begin the shader program at a later start point for execution when a thread completes a particular instruction or set of instructions in the shader program.

9. The method of claim 1, comprising:

at least one execution thread that starts its execution of the shader program at a first start point in the sequence of instructions for the shader program storing the results that it generates by execution of the instructions in registers for use by other threads that start their concurrent execution of the shader program at a later point in the sequence of instructions for the shader program.

10. The method of claim 1, wherein:

executing the shader program for the execution threads comprises:

executing the shader program for one or more of the execution threads starting at the first point in the sequence of instructions for the shader program;

concurrently executing the shader program for another one or ones of the execution threads starting at a later point in the sequence of instructions for the shader program;

stalling execution of the shader program for one or more of the execution threads that started at the later point in the sequence of instructions until execution of a particular instruction or instructions of the shader program for one or more of the execution threads that started at the first point in the sequence of instructions has been completed; and once execution of the particular instruction or instructions has been completed, continuing execution of the shader program for one or more of the stalled execution threads while concurrently executing the shader program for the one or more execution threads that started at the first point in the sequence of instructions, the continued execution using the results of the execution of the particular instruction or instructions.

11. A method of compiling a program to generate instructions for a shading stage of a graphics processing pipeline that executes instructions to perform shading operations;

the method comprising, for a shader program to be executed by a shader stage:

identifying instructions for shader program expressions that will produce the same result for all the work items of a set of a same type of work items that the shader program is to be executed for, and ordering the identified instructions in an execution order of the shader program before instructions for shader program expressions that are required to be executed for each work item individually.

12. A graphics processing pipeline comprising:

programmable shading stage processing circuitry that is configured to execute instructions to perform shading operations; and execution thread issuing circuitry configured to, when the shader stage processing circuitry is to execute a shader program to perform shading operations for a type of work item, the shader program comprising a sequence of instructions to be performed when executing the shader program:

issue plural execution threads to the shader stage processing circuitry for which the shader program is to be executed for execution, the issuing of the execution threads to the shader stage processing circuitry for execution of the shader program being configured such that the execution of the shader program can be started at different instructions within the sequence of instructions for the shader program for different ones of the execution threads for the same type of work item;

and wherein:

the programmable shading stage processing circuitry is configured to execute a shader program for plural execution threads by:

executing the shader program for one or more of the plural execution threads starting at a first point in the sequence of instructions for the shader program; and concurrently executing the shader program for another one or ones of the plural execution threads starting at a different point in the sequence of instructions for the shader program.

13. The pipeline of claim 12, wherein:

execution threads for which the shader program is to be executed are able to start execution of the shader program at the start of the shader program and are able to start concurrent execution of the shader program after at least some instructions in the shader program that calculate common expressions in the shader program.

14. The pipeline of claim 12, wherein:

execution threads are able to start concurrent execution of the shader program after instructions that execute expressions in the shader program that are common for a subset of a set of execution threads that the shader program is being executed for.

15. The pipeline of claim 12, wherein:

the instructions for any shader program expressions that will produce a common result for all the threads of a set of threads that the shader program is to be executed for are earlier in the sequence of instructions for the shader program than any instructions for shader program expressions that are required to be executed for each thread individually.

16. The pipeline of claim 12, wherein the pipeline is configured to be able to:

for a shader program that includes instructions that execute shader program expressions that will produce a common result for all the threads of a set of threads that the shader program is to be executed for; and instructions that execute expressions that need to be executed for each thread individually, but which are not dependent upon the results of the instructions that execute common expressions in the shader program;

start the concurrent execution of execution threads after the instructions in the shader program that execute the common expressions in the shader program but before the beginning of the instructions that execute expressions that need to be executed for each thread individually, but which are not dependent upon the results of the instructions that execute common expressions in the shader program.

17. The pipeline of claim 12, wherein the execution thread issuing circuitry is configured to:

issue a single thread for a work item that a shader program is to be executed for.

18. The pipeline of claim 12, wherein the execution thread issuing circuitry is configured to be able to:

issue plural threads for a work item that a shader program is to be executed for, with each thread starting its execution of the shader program at a different instruction within the sequence of instructions for the shader program.

19. The pipeline of claim 12, wherein the pipeline further comprises processing circuitry configured to:

track the completion of particular instructions or sets of instructions in the shader program by execution threads; and the execution thread issuing circuitry is configured to release threads that are to begin the shader program at a later start point for execution when a thread completes a particular instruction or set of instructions in the shader program.

20. The pipeline of claim 12, wherein the programmable shading stage processing circuitry is configured to execute the shader program for the execution threads by:

for at least one execution thread that starts its execution of the shader program at a first start point in the sequence of instructions for the shader program, storing the results that the execution thread generates by execution of the instructions in registers for use by other threads that start their concurrent execution of the shader program at a later point in the sequence of instructions for the shader program.

21. The pipeline of claim 12, wherein:

the programmable shading stage processing circuitry is configured to execute a shader program for plural execution threads by:

executing the shader program for one or more of the plural execution threads starting at the first point in the sequence of instructions for the shader program; and concurrently executing the shader program for another one or ones of the plural execution threads starting at a later point in the sequence of instructions for the shader program;

stalling execution of the shader program for one or more of the execution threads that started at the later point in the sequence of instructions until execution of a particular instruction or instructions of the shader program for one or more of the execution threads that started at the first point in the sequence of instructions has been completed; and once execution of the particular instruction or instructions has been completed, continuing execution of the shader program for one or more of the stalled execution threads while concurrently executing the shader program for the one or more execution threads that started at the first point in the sequence of instructions, the continued execution using the results of the execution of the particular instruction or instructions.

22. A non-transitory computer readable storage medium storing computer software code which when executing on a processor performs a method of compiling a program to generate instructions for a shading stage of a graphics processing pipeline that executes instructions to perform shading operations;

the method comprising, for a shader program to be executed by a shader stage:

identifying instructions for shader program expressions that will produce the same result for all the work items of a set of the same type of work items that the shader program is to be executed for, and placing the identified instructions in an execution order of the shader program to execute before instructions for shader program expressions that are required to be executed for each work item individually.

23. A non-transitory computer readable storage medium storing computer software code which when executing on a processor performs a method of operating a graphics processing pipeline which includes a programmable shading stage that executes instructions to perform shading operations, the method comprising:
when the shader stage is to execute a shader program to perform shading operations for a work item, the shader program comprising a sequence of instructions to be performed when executing the shader program:
issuing plural execution threads to the shader stage for which the shader program is to be executed for execution;
wherein:
the issuing of the execution threads to the shader stage for execution of the shader program is configured such that the execution of the shader program can be started at different instructions within the sequence of instructions for the shader program for different ones of the execution threads for the work item; and
executing the shader program for the execution threads;
wherein:
executing the shader program for the execution threads comprises:
executing the shader program for one or more of the execution threads starting at a first point in the sequence of instructions for the shader program; and
concurrently executing the shader program for another one or ones of the execution threads starting at a different point in the sequence of instructions for the shader program.

24. The computer readable storage medium of claim 23, wherein:
executing the shader program for the execution threads comprises:
executing the shader program for one or more of the execution threads starting at the first point in the sequence of instructions for the shader program; and
concurrently executing the shader program for another one or ones of the execution threads starting at a later point in the sequence of instructions for the shader program;
stalling execution of the shader program for one or more of the execution threads that started at the later point in the sequence of instructions until execution of a particular instruction or instructions of the shader program for one or more of the execution threads that started at the first point in the sequence of instructions has been completed; and
once execution of the particular instruction or instructions has been completed, continuing execution of the shader program for one or more of the stalled execution threads while concurrently executing the shader program for the one or more execution threads that started at the first point in the sequence of instructions, the continued execution using the results of the execution of the particular instruction or instructions.

* * * * *